July 10, 1923.
J. C. DIETRICH
ICE SAW
Filed March 20, 1922
1,461,479
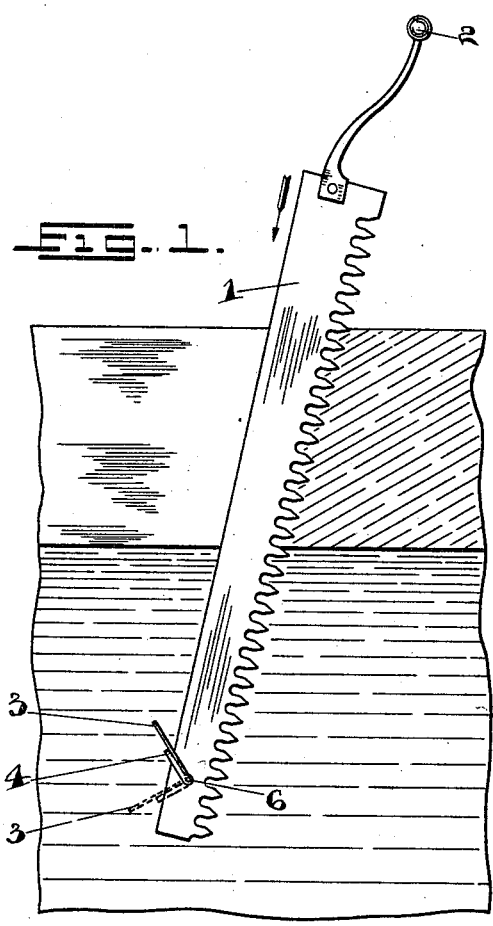
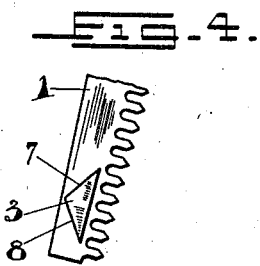
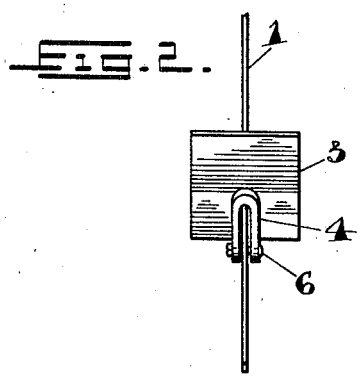
INVENTOR
J. C. Dietrich.
BY J. Edward Maybee.
ATTY.

Patented July 10, 1923.

1,461,479

UNITED STATES PATENT OFFICE.

JEROME COLWELL DIETRICH, OF GALT, ONTARIO, CANADA.

ICE SAW.

Application filed March 20, 1922. Serial No. 545,326.

*To all whom it may concern:*

Be it known that I, JEROME C. DIETRICH, of the city of Galt, in the county of Waterloo, Province of Ontario, Canada, a subject of the King of Great Britain, have invented certain new and useful Improvements in Ice Saws, of which the following is a specification.

This invention relates to saws used for cutting ice while still in position on the surface of the river or other body of water on which it has been formed. Such saws commonly comprise a blade and a handle secured to one end of the blade, which is usually toothed to cut on the down stroke.

Owing partly to the reduction of weight of the saw which results from its working in the water below the ice, it is very difficult to obtain a sufficient pressure of the saw against the ice for effective cutting and the weight of the saw cannot conveniently be increased to increase the pressure, more particularly as the saw must be used in a nearly vertical position in which its weight is nearly inoperative to aid in giving the desired pressure.

My object, therefore, is to devise means for pressing the saw against the ice both during the upstroke and during the downstroke, thus enabling a double cutting blade to be used, and to secure this pressure without materially increasing the weight of the saw blade.

I attain my objects by means of the constructions hereinafter described and illustrated in the accompanying drawings in which—

Fig. 1 is a side elevation of an ice saw constructed in accordance with my invention;

Fig. 2 is a front elevation of the same;

Fig. 3 a side elevation of the movable vane; and

Fig. 4 a side elevation of part of a saw showing a modified form of vane.

In the drawings like numerals of reference indicate corresponding parts in the different figures.

1 is a saw blade, which is in the main of an ordinary type, but which is provided with teeth adapted to cut with the saw moving in either direction.

One end of the saw is provided with a handle 2 of any ordinary form, whereby the saw may be operated by a person standing on the surface of the ice.

The end of the saw blade remote from the handle is provided with a vane 3 adapted to press the saw against its work when the saw blade is moved longitudinally.

In the preferred form this vane is hinged on the blade so that it may swing to either of two positions inclined to the back of the blade of the saw. When the saw is pushed downward the vane swings to the position shown in full lines in Fig. 1, so that the pressure of the water through which it is being forced tends to press the teeth of the saw towards the ice at the bottom of the saw kerf. When the direction of movement of the saw blade is reversed, the vane swings to the position shown in dotted lines and again the pressure of the water through which the saw blade is being moved tends to press the teeth of the saw against the bottom of the saw kerf.

In the preferred construction the vane comprises a plate notched or slit to straddle the back of the saw, and a U-shaped member is welded thereto which parallels the sides of the notch and is provided with eyes 5 in its ends through which and the saw blade passes a bolt 6 which forms a pivot for the vane. The notch in the vane is of such a depth as to limit the swing of the vane in either direction when the vane has reached such an angle as experience shows to give the best results. In the drawings an angle of 45° to the length of the blade is shown as probably giving the best results.

In Fig. 4 a somewhat simpler construction is shown in which the vane is fixed and provided with an inclined surface 7 facing towards one end of the saw and an inclined surface 8 facing towards the other end of the saw, one being operative when the saw is moved in one direction and the other when the saw is operated in the other direction. As these surfaces are so positioned that one shields the other as the saw is moved lengthwise, the one has no material tendency to neutralize the action of the other, yet it would be preferable to fill in the space between them, which is best done by forming the vane as a solid block.

Various other modifications of the vane might be devised which would satisfactorily attain the objects of my invention as set out in the preamble to this specification.

What I claim as my invention is:—

1. An ice saw having a vane attachment connected to its blade back of the teeth and adapted to press the saw against its work when said blade is moved longitudinally.

2. An ice saw having a vane attachment connected to its blade back of the teeth and adapted to press the saw against its work when said blade is moved longitudinally in either direction.

3. An ice saw having a swinging vane connected to its blade adapted to press the saw against its work when said blade is moved longitudinally in either direction.

4. An ice saw having a vane attachment connected to and extending laterally from each side of its blade back of the teeth and adapted to press the saw against its work when said blade is moved longitudinally.

5. An ice saw having a vane attachment connected to and extending laterally from each side of its blade back of the teeth and adapted to press the saw against its work when said blade is moved longitudinally in either direction.

6. An ice saw having a swinging vane connected to and extending laterally from each side of its blade adapted to press the saw against its work when said blade is moved longitudinally in either direction.

7. An ice saw in combination with a vane having a notch formed therein extending in from one edge whereby the vane may be positioned straddling the back of the saw blade; and means pivotally connecting the vane to the blade on an axis transverse of the blade, the notch being of such a depth as to, by the engagement of its inner end with the back of the blade, limit the swing of the vane in either direction to positions inclined to the back of the blade.

Signed at Galt, Ontario, this 7th day of March, 1922.

JEROME COLWELL DIETRICH.